(12) United States Patent
Brown et al.

(10) Patent No.: US 6,185,520 B1
(45) Date of Patent: Feb. 6, 2001

(54) METHOD AND SYSTEM FOR BUS SWITCHING DATA TRANSFERS

(75) Inventors: David Robert Brown, San Jose, CA (US); Christopher Hume Lamb, Weston, MA (US)

(73) Assignee: 3Com Corporation, Santa Clara, CA (US)

(*) Notice: Under 35 U.S.C. 154(b), the term of this patent shall be extended for 0 days.

(21) Appl. No.: 09/083,909

(22) Filed: May 22, 1998

(51) Int. Cl.$^7$ ................................................. G06F 9/455
(52) U.S. Cl. ............................ 703/25; 703/24; 703/26; 710/101; 710/107; 710/113
(58) Field of Search .................... 395/500.46, 500.44, 395/500.45, 500.47, 500.48; 710/101, 107, 113, 100, 104, 105, 129, 131, 52, 128; 703/25, 24, 26

(56) References Cited

U.S. PATENT DOCUMENTS

| | | | |
|---|---|---|---|
| 5,341,495 | * 8/1994 | Joyce et al. | 710/105 |
| 5,596,729 | * 1/1997 | Lester et al. | 710/110 |
| 5,655,145 | * 8/1997 | Chejlava, Jr. et al. | 710/1 |
| 5,768,598 | * 6/1998 | Marisetty et al. | 710/104 |
| 5,812,827 | * 9/1998 | McGrath | 395/500.46 |
| 5,822,568 | * 10/1998 | Swamstrom | 395/500.45 |
| 5,826,103 | * 10/1998 | Whittaker | 710/8 |
| 5,838,932 | * 11/1998 | Alzien | 710/128 |
| 5,857,090 | * 1/1999 | Davis et al. | 395/500.46 |
| 5,907,688 | * 5/1999 | Hauck et al. | 710/107 |
| 5,954,809 | * 9/1999 | Riley et al. | 710/119 |
| 5,983,299 | * 11/1999 | Qureshi | 710/107 |
| 5,983,302 | * 11/1999 | Christiansen et al. | 710/113 |

OTHER PUBLICATIONS

Takahashi et al., "A shared–bus Control Mechanism and a Cache Coherence Protocol for a High–Performance On–Chip Multiprocessor", Proceedings of the Second International Symposium on High–Performance Computer Architectures, pp. 314–322, Feb. 1996.*

Takahasi et al., "A Shared–bus Control Mechanism for a Cache Coherence Protocol for a High–Performance On–Chip Multiprocessor", Proc. Second Inter. Symp. on High–Performance Comp. Arch., pp. 314–322, 1996.*

Hseih et al., "On the Design of a Local Switch for Heterogenous Multi–Subsystem Interconnect", Proc. Tencon–93, IEEE Reg. Conf. on Computer, Comm., Control, and Power Eng., vol. 3, pp. 250–254.*

Seban et al., "A High Performance Critical Section Protocol for Distributed Systems", Proc. 1994 IEEE Aerospace Applications Conf. , pp. 1–17, Feb. 1994.*

* cited by examiner

Primary Examiner—Kevin J. Teska
Assistant Examiner—Douglas W. Sergent
(74) Attorney, Agent, or Firm—Wagner, Murabito & Hao LLP

(57) ABSTRACT

In a computer system having a plurality of peripheral devices, a data transfer system for implementing transparent direct communication between the devices and the computer system. The system of the present invention includes a switch having a plurality of ports. Each of the plurality of ports is adapted to couple to a respective one of a plurality of devices. Each of the plurality of ports is further adapted to accept data from its respective device and transmit data to its respective device in a bi-directional manner. The switch communicatively couples a first pair of the plurality of ports to enable communication between their respective devices and communicatively couples a second pair of the plurality of ports to enable communication between their respective devices such that communication between the first pair of ports and communication between the second pair of ports occurs simultaneously and independently, thereby implementing efficient switched data transfers between the respective devices and greatly increasing the total data transfer bandwidth of the computer system.

16 Claims, 8 Drawing Sheets

METHOD AND SYSTEM FOR BUS SWITCHING DATA TRANSFERS

TECHNICAL FIELD

The present invention pertains to the field of computer system bus architectures. More particularly, the present invention relates to a switched PCI bus architecture for a computer system to reduce access and data transfer latency.

BACKGROUND ART

A bus architecture of a computer system conveys much of the information and signals involved in the computer system's operation. In a typical computer system, one or more busses are used to connect a central processing unit (CPU) to a random access memory and to input/output elements so that data and control signals can be readily transmitted between these different components. When the CPU executes its programming, it is imperative that data and information flow as fast as possible in order to make the computer system as responsive as possible to the user.

In the past, computer systems were primarily applied to processing rather mundane, repetitive numerical and/or textual tasks involving number-crunching, spread sheeting, and word processing. These simple tasks merely entailed entering data from a keyboard, processing the data according to some computer program, and then displaying the resulting text or numbers on a computer monitor and perhaps later storing these results in a magnetic disk drive. With the advent of digital media applications, for example, computer systems are now commonly required to accept and process large amounts of data in a wide variety of different formats. These formats range from audio and full motion video to highly realistic computer-generated three-dimensional graphic images.

A computer system's suitability for the above applications often depends upon the functionality of the computer system's peripheral devices. For example, the speed and responsiveness of the computer system's graphics adapter is a major factor in a computer system's usefulness as an entertainment device. Or, for example, the speed with which video files can be retrieved from a hard disk drive and played by the graphics adapter determines the computer system's usefulness as a training aid. Hence, in addition to the speed of the computer system's CPU, the rate at which data can be transferred among the various peripheral devices often determines whether the computer system is suited for a particular purpose. The electronics industry has, over time, developed several types of bus architectures. Recently, the PCI (peripheral component interconnect) bus architecture has become one of the most widely used, widely supported bus architectures in the industry. The PCI bus was developed to provide a high speed, low latency bus architecture from which a large variety of systems could be developed.

Prior Art FIG. 1 shows a typical PCI bus architecture 100. PCI bus architecture 100 is comprised of a CPU 102 and a main memory 104, coupled to a host PCI bridge containing arbiter 106 (hereafter arbiter 106) through a CPU local bus 108 and memory bus 110, respectively. A PCI bus 112 is coupled to each of PCI agents 114, 116, 118, 120, 122, 124 respectively, and is coupled to arbiter 106.

Referring still to Prior Art FIG. 1, each of PCI agents 114, 116, 118, 120, 122, 124 (hereafter, PCI agents 114–124) residing on PCI bus 112 uses PCI bus 112 to transmit and receive data. PCI bus 112 is comprised of functional signal lines, for example, interface control lines, address/data lines, error signal lines, and the like. Each of PCI agents 114–124 is coupled to the functional signal lines comprising PCI bus 112. When one of PCI agents 114–124 requires the use of PCI bus 112 to transmit data, it requests PCI bus ownership from arbiter 106. The PCI agent requesting ownership is referred to as an "initiator," or bus master. Upon being granted ownership of PCI bus 112 from arbiter 106, the initiator (e.g., PCI agent 116) carries out its respective data transfer.

Each of PCI agents 114–124 may independently request PCI bus ownership. Thus, at any given time, several of PCI agents 114–124 may be requesting PCI bus ownership simultaneously. Where there are simultaneous requests for PCI bus ownership, arbiter 106 arbitrates between requesting PCI agents to determine which requesting PCI agent is granted PCI bus ownership. When one of PCI agents 114–124 is granted PCI bus ownership, it initiates a transaction (e.g., data transfer) with a "target" or slave device (e.g., main memory 104). When the data transaction is complete, the PCI agent relinquishes ownership of the PCI bus, allowing arbiter 106 to reassign PCI bus 112 to another requesting PCI agent.

Thus, in PCI bus architecture 100, as with most other types of bus architectures, only one data transaction can take place on PCI bus 112 at any given time. In order to maximize the efficiency and data transfer bandwidth of PCI bus 112, PCI agents 114–124 and bridge 106 (which functions as an agent on behalf of CPU 102) follow a definitive set of protocols and rules. These protocols are designed to standardize the method of accessing, utilizing, and relinquishing PCI bus 112, so as to maximize its data transfer bandwidth. The PCI bus protocols and specifications are set forth in an industry standard PCI specification (e.g., PCI Specification—Revision 2.1). Although the PCI specification provides for burst data transfer rates of up to 528 Mbytes per second (e.g., a 64 bit PCI bus 112 operating at 66 MHz), the major problem with PCI bus 112, as with most other types of bus architectures, is the fact that it is a "shared" bus.

PCI bus 112 is a shared media bus architecture. All of PCI agents 114–124 share the same bus 112. They all rely on a single bus to meet their individual communication needs. However, as described above, PCI bus 112 can establish communications between only two of PCI agents 114–124 at any given time. Hence, if PCI bus 112 is currently busy transmitting signals between two of the devices (e.g., device 114 and device 124), then all the other devices (e.g., device 122, device 124, etc.) must wait their turn until that transaction is complete, and PCI bus 112 again becomes available. As described above, arbiter 106 allocates ownership of PCI bus 112, resolving which of the PCI agents 114–124 uses PCI bus 112 at any given time.

In this manner, PCI bus 112 is analogous to a telephone "party" line, whereby only one conversation can take place amongst a host of different handsets serviced by the party line. If the party line is currently busy, one must wait until the prior parties hang up, before one can initiate one's own call. Each of devices 114–124 needs to compete for bus bandwidth to perform input-output. Regardless of the speed of CPU 102, the limiting factor of the speed of computer system 100 is very often the bandwidth of PCI bus 112.

In the past, this type of bus architecture offered a simple, efficient, and cost-effective method of transmitting data. For a time, it was also sufficient to handle the amount of data flowing between the various devices residing within the computer system. However, as the demand for low latency data transfer bandwidth has skyrocketed, designers have searched for ways to improve the PCI bus architecture (and other similar bus architectures) by increasing the speed at which data can be conveyed over the bus.

One solution to the bandwidth problem was to increase the width of a bus by adding more wires. The effect is analogous to replacing a two-lane road with a ten-lane super freeway. However, the increase in bus width consumes valuable space on an already densely packed and overcrowded printed circuit board. Furthermore, each of the semiconductor chips connected to the bus must have an equivalent number of pins to match the increased bus width for accepting and outputting its signals. These additional pins significantly increase the size of the chips. It becomes more difficult to fit these chips onto the printed circuit boards. Additionally, the practical limitation for cost-effective chips and packages impose a physical restriction on the chip's overall size and its number of pins. Typical high-end buses are limited to being 64-bits wide. In other words, 64 bits of data or address can be sent simultaneously in parallel over 64 separate wires. The next step of increasing the bus width to 128 bits wide has become impractical due to this added complexity.

Another solution to the bandwidth problem was to increase the rate (e.g., frequency) at which data is sent over the bus. However, the physics associated with implementing long sets of parallel wires with multiple loads produces a wide range of problems, such as impedance mismatches, reflections, cross-talk, noise, non-linearities, attenuation, distortions, timing, etc. These problems become more severe as the bus frequency increases. Higher bus frequencies cannot be attained without fine tuning, extremely tight tolerances, exotic micro-strip layouts, and extensive testing. It is extremely difficult to mass produce such high frequency computers economically and reliably.

Additionally, a new bus architecture requires a re-design of both the physical and logical interfaces for pre-existing peripheral devices for compatibility with the architecture. With well-known, widely-deployed bus architectures such as PCI, there are many hundreds, if not thousands, of "legacy" peripheral devices in the market place. A new bus specification essentially imposes a new interface standard on the manufactures of these devices and forces the redesign of their products. Pre-existing products run the risk of being abandoned, or "orphaned." As such, it is exceedingly difficult for a new bus specification to gain acceptance and support.

Consequently, peripheral devices and applications used with existing bus architectures (e.g., PCI) are structured to function around the bandwidth limitations of the bus. The nature of the data that the applications transfer via the system bus is accordingly dictated by the bandwidth constraints of the bus. For example, given a 64-bit PCI bus running at 66 MHz, the highest attainable data rate for a typical computer system is 528 Mbytes per second. Although this data rate appears adequate, it is rapidly becoming insufficient in light of the demands imposed by tomorrow's new applications.

In addition, when a PCI bus in a computer system is very busy, the coupled peripheral devices have to wait longer to gain ownership of the PCI bus. To spread bus ownership more evenly, the arbiter of the PCI bus will prematurely terminate the various data transactions more often, causing an initiator to break up its data transaction into a series of smaller transactions. This harms data transfer bandwidth even further, since each transaction has a fixed amount of overhead regardless of the amount of data transferred. Consequently, even though the reason for forcing early termination is to insure that all devices have fair access to the PCI bus, the numerous early terminations reduce the effective data transfer bandwidth of the PCI bus even further.

Thus, what is required is a method and system which effectively provides for greatly-increased data transfer bandwidth between peripheral devices of a computer system. What is required is a method and system which accommodates high-bandwidth applications such as digital video, digital audio, 3D graphics, real-time compression and decompression, and the like. What is further desired is a method of servicing the bandwidth requirements of the above applications while retaining compatibility with existing bus standards. The required system should provide greatly-increased data transfer bandwidth to peripheral devices designed to an existing bus standard in a completely transparent manner. The method and system of the present invention provides a novel solution to the above requirements.

SUMMARY OF THE INVENTION

The present invention provides a method and system which enables greatly increased data transfer bandwidth between peripheral devices of a computer system. The present invention accommodates high bandwidth applications such as digital video, digital audio, 3D graphics, real-time compression and decompression, and the like. The present invention services the data transfer bandwidth requirements of the above applications while retaining compatibility with existing bus standards. In addition, the present invention provides greatly increased data transfer bandwidth to peripheral devices designed to an existing bus standard in a completely transparent manner.

In one embodiment, the present invention comprises a data transfer system for implementing transparent direct communication between a plurality of peripheral devices in a computer system. In this embodiment, the system of the present invention includes a switch having a plurality of ports. Each of the plurality of ports is adapted to couple to a respective one of the plurality of devices. Each of the plurality of ports is further adapted to accept data from its respective device and transmit data to its respective device in a bi-directional manner.

Each of the ports can be coupled to a dedicated bus or a shared bus. In the case of a dedicated bus, the switch of the present invention, via the port, spoofs the handshake signals expected by the device such that communication is transparent with respect to the device. In the case of a shared bus being coupled to the port, the switch supports the arbitration protocols necessary for interfacing multiple devices to the shared bus. In both cases, however, communications between ports is dedicated and independent. The switch of the present invention can be adapted to support different bus protocols (e.g., PCI, Microchannel, EISA, etc.), as dictated by the computer system in which the present invention is incorporated. In this manner, the system of the present invention emulates shared bus protocols, facilitating its easy interaction with existing shared bus devices, while providing the benefits of dedicated switched data transfers.

The switch is adapted to couple communicatively pairs of ports, thereby enabling independent communication between them. For example, a first pair of the plurality of ports can be communicatively coupled to enable communication between their respective devices and a second pair of ports can be communicatively coupled to enable communication between their respective devices such that communication between the first pair of ports and communication between the second pair of ports occurs simultaneously and independently. This eliminates the arbitration and latency problems inherent in prior art shared busses. The independent switched data transfer between devices, in accordance with the present invention, greatly increases the total data transfer bandwidth of the computer system.

BRIEF DESCRIPTION OF THE DRAWINGS

The present invention is illustrated by way of example and not by way of limitation in the figures of the accompanying drawings, in which like reference numerals refer to similar elements, and in which.

Prior art

DETAILED DESCRIPTION OF THE INVENTION

Figure 1:
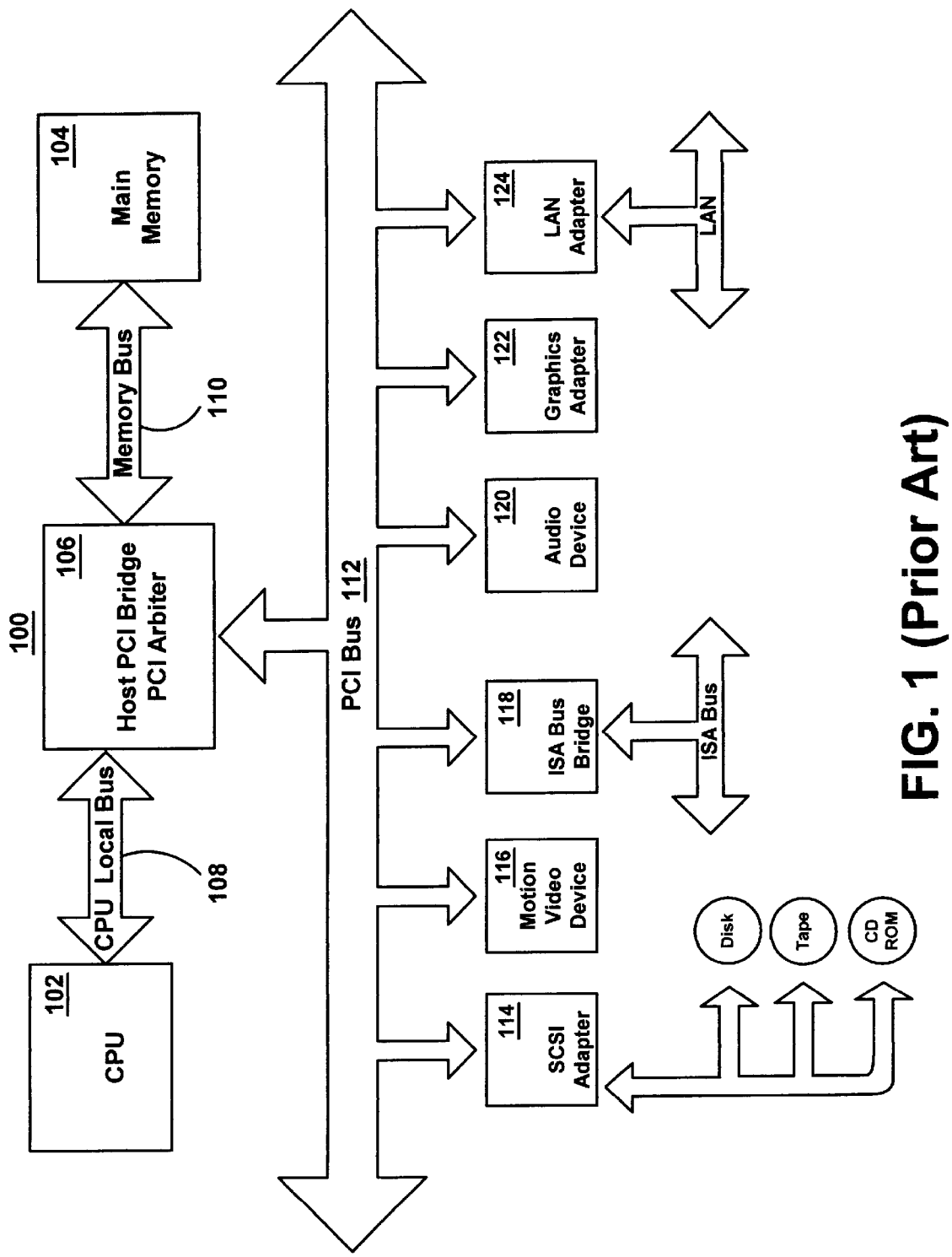
FIG. 1 shows a typical prior art PCI bus architecture used in many computer systems.

In the following detailed description of the present invention, a method and system for simultaneous high bandwidth peer to peer data input-output, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to obscure aspects of the present invention unnecessarily.

Some portions of the detailed descriptions which follow are presented in terms of procedures, logic blocks, processing, and other symbolic representations of operations on data bits within a computer memory. These descriptions and representations are the means used by those skilled in the data processing arts to convey most effectively the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "emulating" or "implementing," "transferring," "executing," "arbitrating," "configuring," "bursting," "initializing," or the like, refer to the actions and processes of a computer system (e.g., computer system 500 of FIG. 5A), or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides a method and system which enables greatly-increased data transfer bandwidth between peripheral devices of a computer system. The present invention accommodates high-bandwidth applications such as digital video, digital audio, 3D graphics, real-time compression and decompression, and the like. The present invention services the data transfer bandwidth requirements of the above applications while retaining compatibility with existing bus standards. In addition, the present invention provides greatly-increased data transfer bandwidth to peripheral devices designed to an existing bus standard in a completely transparent manner. The present invention and its benefits are further described below.

Figure 2:
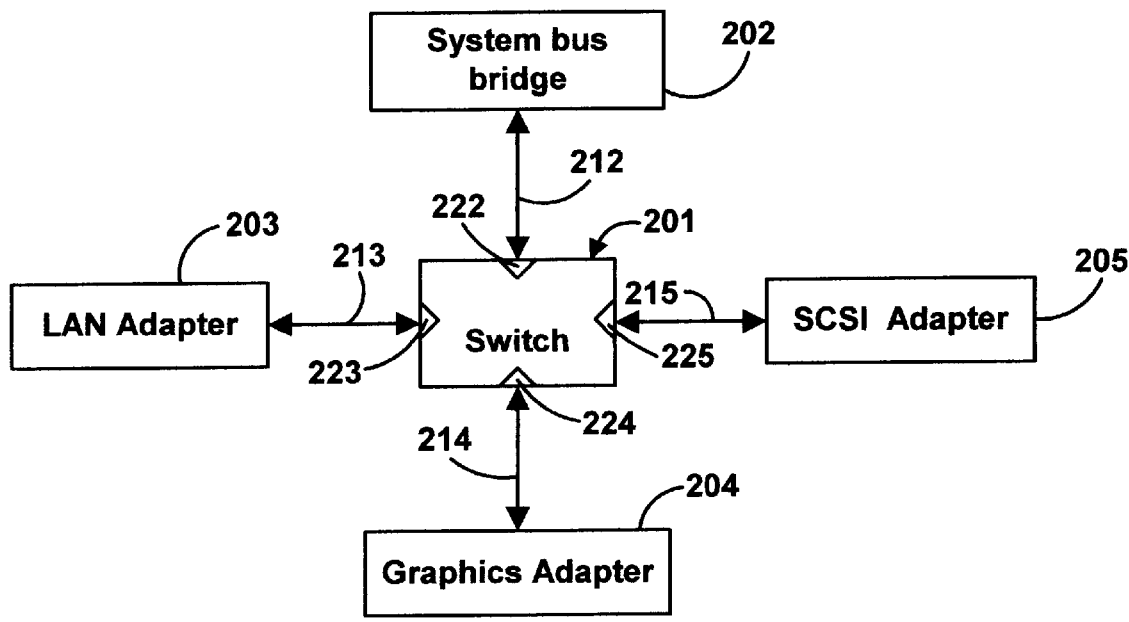
FIG. 2 shows a switch coupled to a plurality of peripheral devices in accordance with one embodiment of the present invention.

Referring now to FIG. 2, a switch 201 in accordance with one embodiment of the present invention is shown. As shown in FIG. 2, switch 201 is coupled to a system bus bridge 202, a LAN adapter 203, a graphics adapter 204, and a SCSI (small computer standard interface) adapter 205. Switch 201 is coupled to each of components 202–205 via respective dedicated busses, bus 212, bus 213, bus 214, and bus 215. Similarly, each of busses 212–215 couples to a respective one of communications ports 222–225 as shown in FIG. 2.

In accordance with the present invention, switch 201 functions by communicatively coupling components 202–205 independently. For example, switch 201 communicatively couples LAN adapter 203 and system bus bridge 202 to enable data transfers between them while simultaneously coupling SCSI adapter 205 and graphics adapter 204. Data transfers between the devices can occur simultaneously and independent with respect to each other. In this manner, switch 201 replaces the shared bus architectures of the prior art, thereby eliminating a primary bottle-neck in the total data transfer bandwidth of a computer system incorporating switch 201.

Where as a prior art bus system allows only one initiator (e.g., LAN adapter 203) to access a prior art bus at a time, switch 201 allows multiple initiators (e.g., SCSI adapter 205 and LAN adapter 203) to execute simultaneous data transactions. For example, in accordance with the present invention, switch 201 allows LAN adapter 203 to transfer data to main memory (not shown) via system bus bridge 202 while a simultaneous data transfer occurs between SCSI adapter 205 and graphics adapter 204. In so doing, switch 201 does not break up the data transfers from LAN adapter 203 and SCSI adapter 205 in order to allow them to share a common media, as with prior art busses. Data transfers from LAN adapter 203 and SCSI adapter 205 occur at "full" speed, without interruption and without externally imposed latency.

Figure 3:
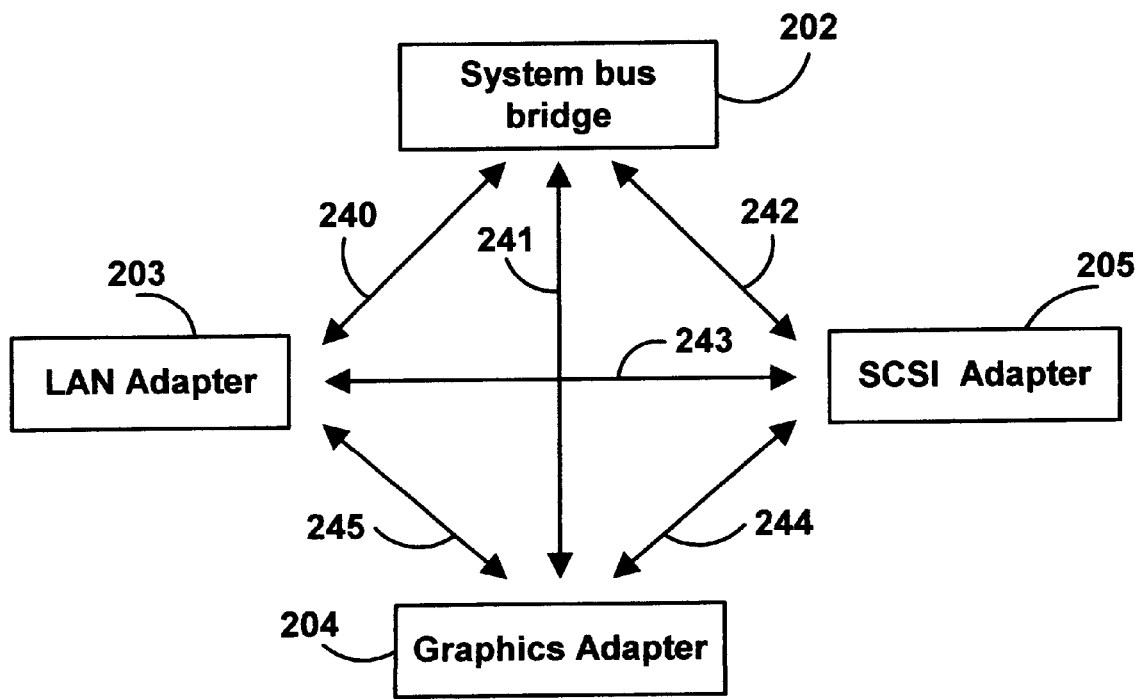
FIG. 3 shows a diagram of the logical connections of the ports of the switch of FIG. 2.

Referring now to FIG. 3, the logical connections between components 202–205 are shown. The logical connections are implemented by switch 201 and are numbered as connections 240–245 as shown in FIG. 3. Each of connections 240–245 represents the communicative path created by switch 201. Each of connections 240–245 are depicted as a distinct connection (e.g., connection 240) to show its respective independence from another. For example, connection 240 (between system bus bridge 202 and LAN adapter 203) can be established and used contemporaneously as connection 244 (between SCSI adapter 205 and graphics adapter 204). Since switch 201 is not a shared communications media, as with prior art busses, data can be transferred across connection 240 at the same time as data is being transferred across connection 244. Thus, as shown in FIG. 3, switch 201 can implement any of connections 240–245 independently.

It should be appreciated that although switch 201 is shown with four coupled components, switch 201 can be adapted to support any number of components. For teaching purposes, switch 201 of the present invention is shown in FIG. 3 with only four coupled components.

Figure 4:
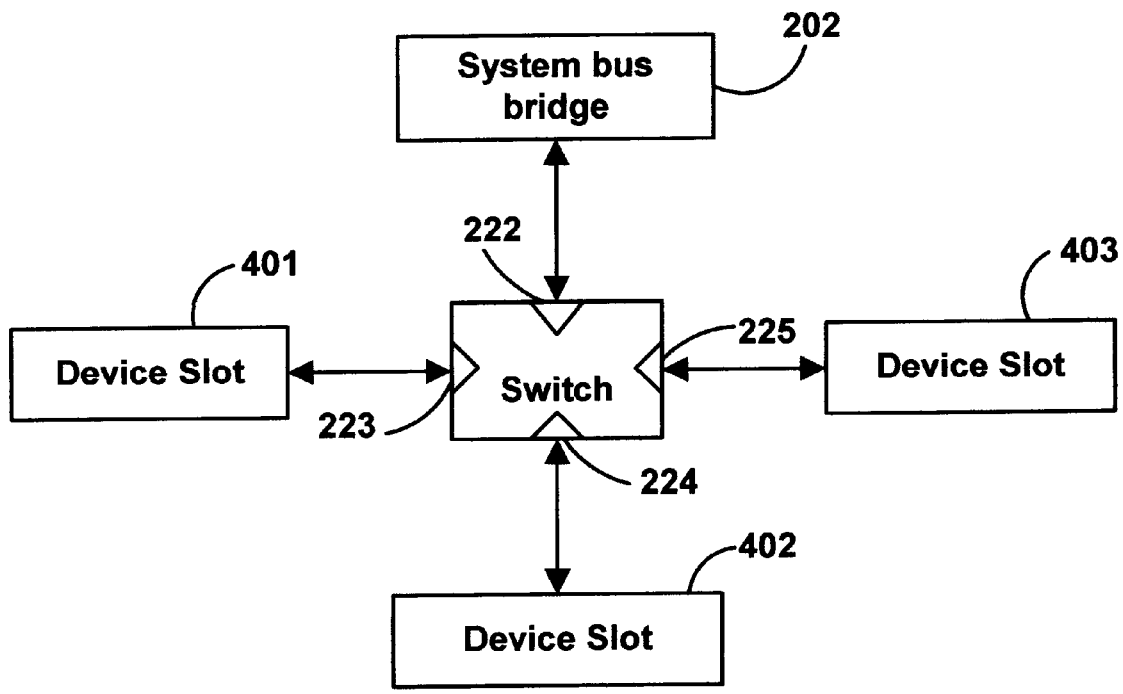
FIG. 4 shows an embodiment of the switch of FIG. 2 wherein the ports of the switch are coupled to peripheral device connection slots.

FIG. 4 shows an embodiment of switch 201 wherein ports 223–225 are coupled to respective device slots 401–403. Device slots 401–403 accommodate discreet peripheral devices, such as, for example, where components 203–205 are add-in PCI peripheral expansion devices. In such an embodiment, device slots 401–403 are adapted to interface physically to and communicate via the appropriate bus protocols, such as PCI, EISA, Microchannel, SCSI, or the like. For example, in a computer system where switch 201 functions with PCI devices, device slots 401–403 are adapted to accept standardized, PCI device connections, and switch 201 is adapted to communicate with the devices using the protocols of the PCI specification.

A primary advantage of such a system is that devices which plug into device slots 401–403 need not be modified in any particular way to function with switch 201. Thus, pre-existing devices are able to function with switch 201 and to obtain the data transfer bandwidth advantages of switch 201 while communicating across device slots 401–403 with their "native" PCI protocols. For example, in a PCI-based system, switch 201 supports all the necessary PCI signals as specified in the PCI specification (e.g., PCI specification 2.1) such as REQ#, GNT#, FRAME#, etc.

Figure 5A:
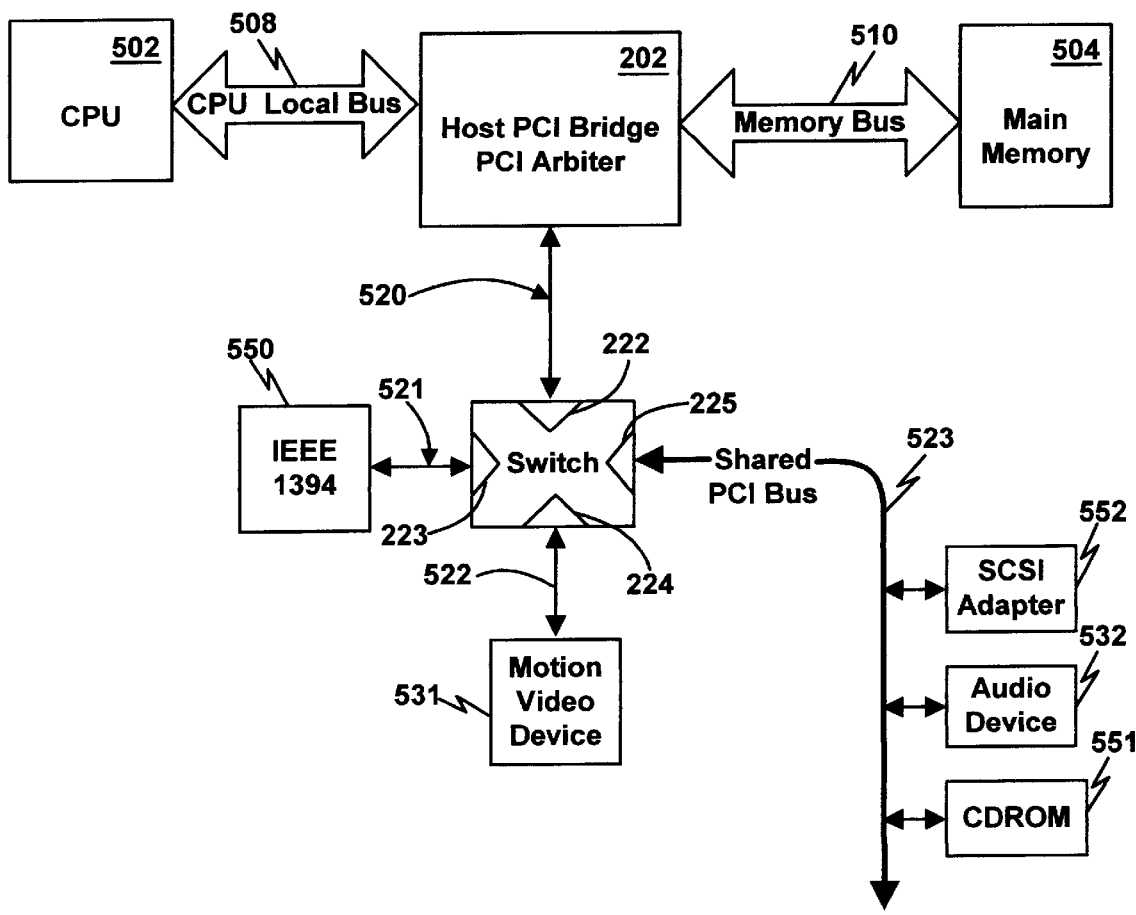
FIG. 5A shows a bus architecture of a computer system in accordance with one embodiment of the present invention.

FIG. 5A shows a PCI based computer system 500 in accordance with one PCI based embodiment of the present invention. Switch 201 of the present invention is incorporated into computer system 500 to provide greatly-increased total data transfer bandwidth. Switch 201 is coupled to system bus bridge 202 (hereafter bridge 202) which in turn is coupled to CPU 502 and main memory 504 via CPU local bus 508 and memory bus 510. A dedicated PCI bus 520 couples switch 201 to bridge 202. Switch 201 is also coupled to an IEEE 1394 adapter 550 and a motion video device 531 via dedicated PCI busses 521 and 522. A shared PCI bus 523 couples SCSI adapter 552, CDROM 551, and an audio device 532 to switch 201. Switch 201 as depicted in FIG. 5A should not be construed as the only possible embodiment of the present invention.

Switch 201 functions within computer system 500 by creating a switching fabric for the devices coupled to PCI busses 521, 522, and 523. Since computer system 500 is a PCI based computer system, switch 201 is adapted to support the PCI specification protocols and signals. Additionally, as described above, by complying with PCI specifications, switch 201 is able to support preexisting PCI devices without requiring that they be modified or redesigned.

With computer system 500, switch 201 is adapted to emulate the PCI handshake and configuration protocols while simultaneously providing the benefits of switched data transfers. For example, switch 201 reduces the PCI REQ#/GNT# "handshake" to one PCI clock cycle by "granting" bus access to an initiating device immediately after that device asserts its REQ# signal. For devices coupled to switch 201 via a dedicated PCI bus (e.g., IEEE 1394 adapter 550 on PCI bus 521), there are only two nodes: the coupled device (e.g., IEEE 1394 adapter 550) and the corresponding port of switch 201 (e.g., port 223). Thus, when the attached device asserts its REQ# signal, switch 201 immediately responds by asserting GNT#(e.g., handshake spoofing) and by acting as a target device (e.g., asserting TRDY#). Switch 201 immediately responds as if it were the target device (e.g., handshake spoofing). As described above, multiple data transactions can occur simultaneously. The resulting data transfer frame is subsequently buffered by switch 201 for transfer to the downstream target device (even though the target device may be busy). By implementing buffered transfers, switch 201 minimizes the effects of latency on total data transfer bandwidth.

Alternatively, switch 201 can implement "retry" protocols in accordance with the PCI specification. Generally, retry protocols define the conditions upon which an initiator device is issued a retry signal by the target device, which causes the initiator to abort the transaction and "retry" it at a later time (e.g., a number of PCI clock cycles, typically 16). The target device is subsequently free to fetch data, queue buffers, finish other internal activity, or otherwise prepare for the data transaction of the initiator. The initiator then retries, and hopefully completes, the transaction. An embodiment of switch 201 which implements retries is less expensive than an embodiment which instead implements buffering.

Switch 201 is also able to support a shared bus, such as shared PCI bus 523 shown in FIG. 5A. In the present embodiment (e.g., computer system 500), switch 201 functions as the arbiter for shared PCI bus 523 and supports the necessary signals needed for configuration and operation.

For example, shared PCI bus 523 can be implemented with a clock speed of 33 MHz or 66 MHz and can have a width of either 32 or 64 bits. Port 225 of switch 201 would be configured accordingly. In the present embodiment, dedicated PCI bus 520 is a 64 bit, 66 MHz PCI bus while each of PCI busses 521, 522, and 523 are 32 bit, 33 MHz busses. This configuration balances the benefits of the faster 66 MHz, 64 bit wide bus 520 against its added cost. By placing the higher bandwidth PCI bus "upstream" between switch 201 and bridge 202, accesses to main memory 504 are faster. However, even though switch 201 increases total data transfer bandwidth, main memory 504 is most often the target of the data transfers, so making the other PCI busses (e.g., PCI bus 521–523) just as fast and wide may not justify the attendant cost. In such a system, the data transfer bandwidth of main memory 504 becomes the bottle-neck.

However, the present invention can increase high-bandwidth device slot to device slot traffic by having switched 64-bit ports, especially for servers with intelligent I/O subsystems that include (for instance) IP (internet protocol) stacks on PCI devices.

It should be noted that in addition to the capabilities described above, switch 201 provides for "store and forward" data bursts where a data transaction from an initiator is buffered and forwarded at a later time (e.g., when the target device is not busy). Switch 201 also supports "cut-through" of data bursts, where successive accesses by an initiator are streamlined for efficiency (similar to the cut-through techniques of LAN switches). Additionally, it should be noted that switch 201 includes the computational resources which enable it to examine the contents of a data frame from a device and prioritize outgoing frames based upon user-defined criteria. This is similar to a multiple output queue technique supported in modern LAN switches (e.g., such as the CoreBuilder 3500 from 3Com Corp.).

It should also be noted that switch 201, in accordance with the present invention, includes the logic for performing address snooping such that switch 201 is able to learn the addresses of the coupled devices. This includes any device coupled downstream from switch 201 and across a PCI-to-PCI bridge (not shown in FIG. 5A). Addresses of coupled PCI devices are configured by a configuration software program executing on CPU 502.

For example, as the configuration process proceeds, switch 201 snoops the addresses of the coupled devices so that during normal operation it can function as an initiator or target, as may be required. Each PCI device includes one or more base address registers (BARs) which are accessed and configured by the configuration program during system initialization. In accordance with PCI protocols, the devices do not explicitly indicate what size address space they require, rather, the configuration program determines the address space size indirectly by writing all ones to each BAR, and then reading back the BAR to determine how many of the high-order bits are implemented. Only then does the configuration program write the actual base address value.

Switch 201 snoops each of the configuration accesses from the configuration program. Switch 201 checks for writes to BARs (which are specific register accesses), ignoring writes of "FFFF FFFF" (Hexadecimal), but noting other writes, and checks for reads of BARs, noting those reads which have contiguous "F"s in the high order bit positions. From this information, the address ranges of the coupled devices are determined. Snooping the configuration process in this manner, across multiple PCI devices and across multiple BARs per PCI device, switch 201 is able to build a comprehensive address map which incorporates all of the coupled PCI devices.

It should be noted that switch 201, as shown in computer system 500 of FIG. 5A, includes the requisite arbitration logic, which enables it to function as an arbiter for coupled PCI devices (e.g., the PCI devices coupled to shared PCI bus 523). Although in typical implementations, the arbitration functionality is incorporated in system bus bridge 202, the incorporation of the arbitration logic within switch 201 allows the arbiter to allocate priority to some ports over others based upon user-defined, or otherwise-defined, criteria. However, since PCI bus 523 is a shared PCI bus, the incorporation of arbitration logic is required.

Figure 5B:
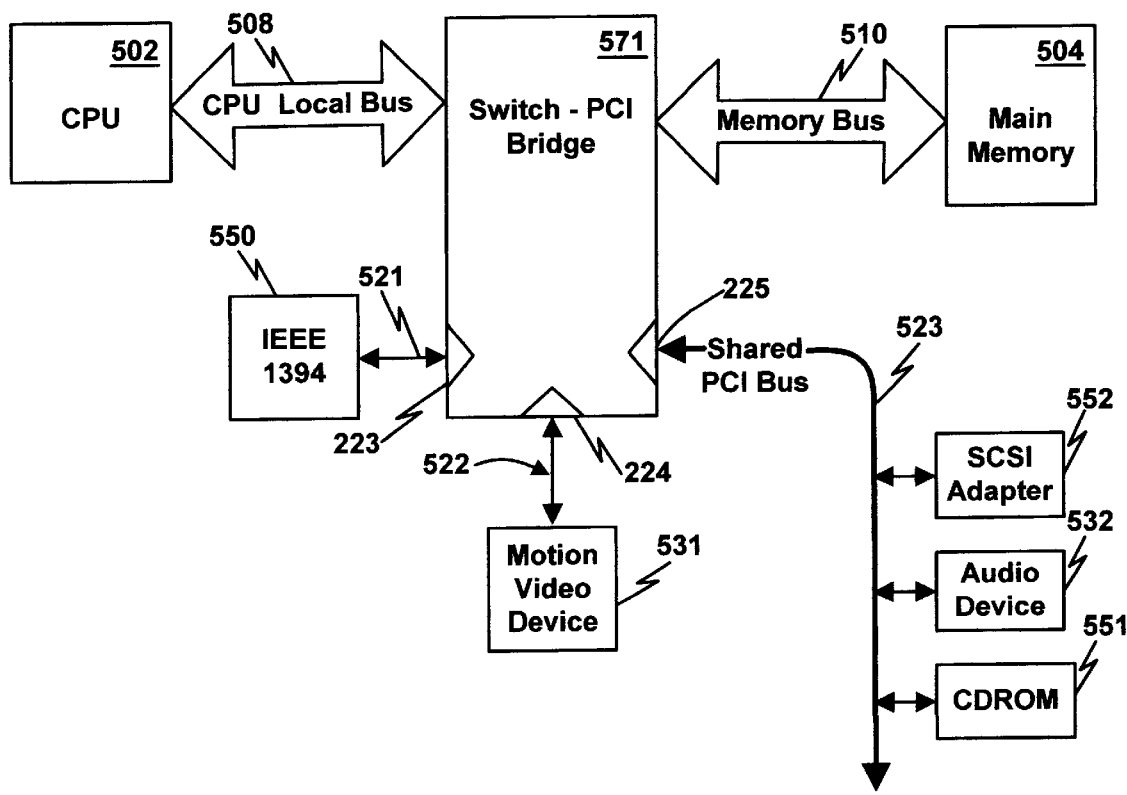
FIG. 5B shows a computer system in accordance with one alternative embodiment of the present invention, wherein the PCI bridge of FIG. 5A and switch of FIG. 5A are integrated into a single unit.

FIG. 5B shows a computer system 570 in accordance with one alternative embodiment of the present invention, wherein the PCI bridge 202 of FIG. 5A and switch 201 of FIG. 5A are integrated. System 570 is similar to system 500 and functions in a similar manner. However, system 570 combines the functionality of bridge 202 of FIG. 5A and the functionality of switch 201 of FIG. 5A into a single unit, a switch-PCI bridge 571. Switch-PCI bridge 570, thus, in functions as the bridge between the CPU local bus 508, memory bus 510, and busses 521, 522, and 523.

Figure 6:
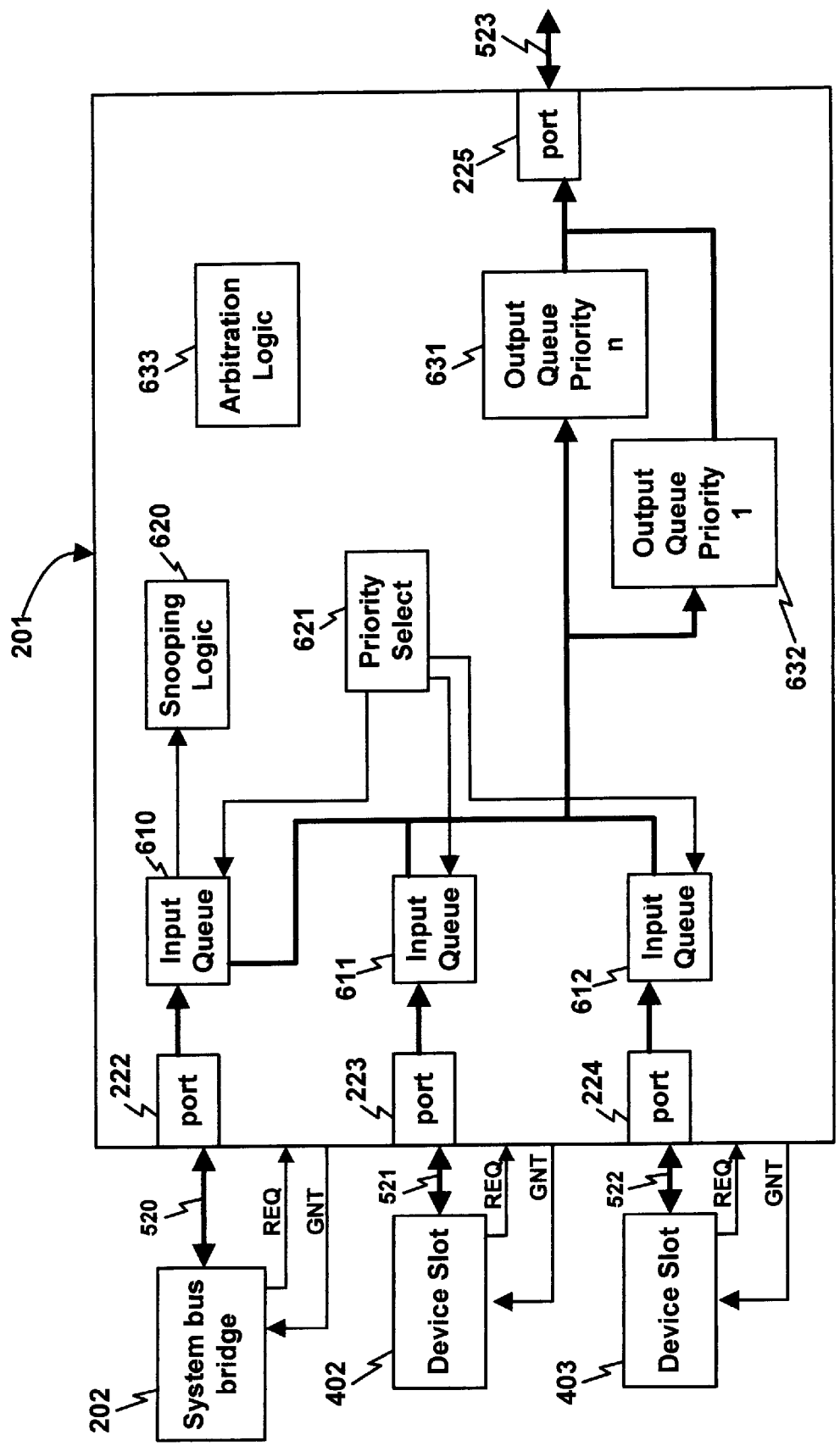
FIG. 6 shows a block diagram of the internal components of a switch in accordance with one embodiment of the present invention.

Referring now to FIG. 6, switch 201 in accordance with one embodiment of the present invention is shown in greater detail. Switch 201 includes an input queue 610, input queue 611, and input queue 612 respectively coupled to port 222, port 223, and port 224. Port 222 is coupled to system bus bridge 202 via bus 520. Ports 223 and 224 are respectively coupled to device slots 402 and 403 via busses 521 and 522. It should be appreciated that a switch of the present invention can include any number of ports. The request and grant lines included in each of the busses are also shown. Arbitration logic 633 controls the request/grant handshaking as described above. Each of input queues 610–612 is coupled to an output queue 631 and an output queue 632. The input queues receive priority information from a priority selection unit 621. The output queues 631–632 are coupled to port 225, which is in turn coupled to bus 523 (e.g., the shared PCI bus 523 shown in FIG. 5A).

Snooping logic 620 is coupled to input queue 610. Snooping logic 620 functions by snooping configuration accesses to each of device slots 401–403 as described above. It should be noted that snooping logic 620 is asymmetrical, in that snooping logic 620 functions with configuration accesses sourced by the system bus bridge 202 on behalf of CPU 502.

Input queues 610–612 implement the "store and forward" functionality of switch 201. Output queues 631–632 implement the prioritization functionality of switch 201, wherein higher priority data is forwarded before lower priority data. In accordance with the present invention, a larger number of output priority queues may be implemented to provide more granularity of prioritization. It should also be noted that data stored in any one of the output ports is organized along transaction boundaries corresponding to the data transaction of the originating devices, as opposed to simple byte boundaries. As depicted in FIG. 6, data flows from ports 222–224 towards and out through port 225.

It should be noted that for the purposes of clarity, the PCI ports 222–225 are shown unidirectionally (e.g., switch 201 is depicted in the case where data flows from ports 222–224). However, it should be appreciated that the ports 222–225 are bi-directional, and, thus, have substantially the same components 610–632 for both directions. It should further be appreciated that port 225 is but one of the ports of switch 201 and that the data path (e.g., via components 610–632) are the same for each of the ports. Additionally, it should be appreciated that, although not explicitly depicted in FIG. 6, the REQ and GNT lines of system bus bridge 202, device slot 402, and device slot 403 are coupled to arbitration logic 633. Arbitration logic 633 is similarly coupled to the devices on bus 523 (not shown).

Figure 7:
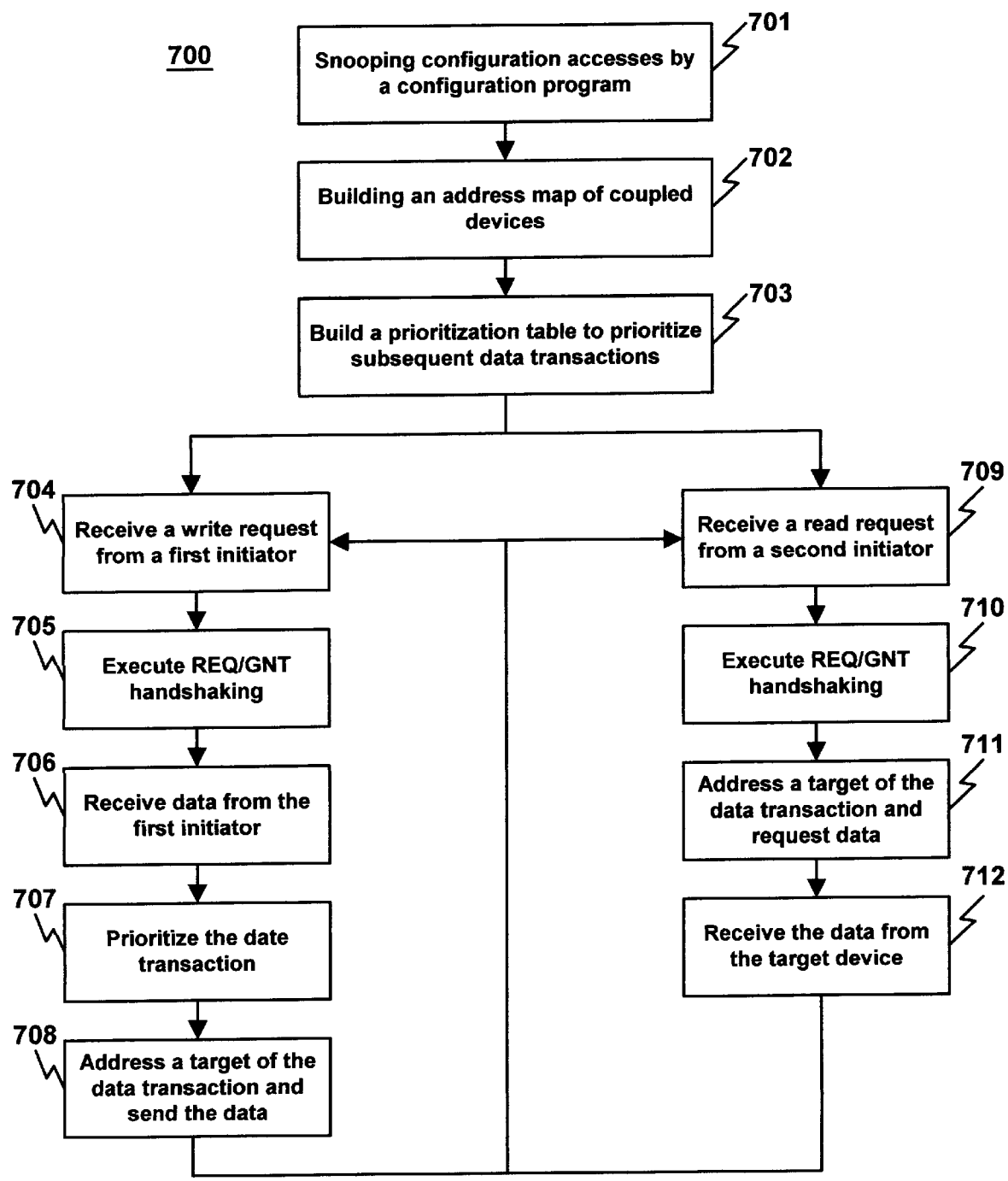
FIG. 7 shows a flow chart of the steps of a communications process in accordance with one embodiment of the present invention.

With reference now to FIG. 7, a flow chart of the steps of a process 700 in accordance with one embodiment of the present invention is shown. Process 700 shows one of many typical operating process of a switch (e.g., switch 201) of the present invention functioning in a PCI-based computer system (e.g., computer system 500). In this case, process 700 depicts simultaneous write and read data transactions by two initiator devices.

Process 700 begins in step 701, where switch 201 snoops the configuration accesses of a configuration program running on the computer system's CPU (e.g., CPU 502 of FIG. 5A). As described above, the configuration program accesses configuration registers and base address registers during the initialization phase of the computer system. Switch 201 snoops these accesses to determine their address ranges.

In step 702, an address map for each of the devices coupled to the computer system is built using the information gained from the snooping. As described above, the address ranges snooped during the configuration phase are used to determine an address map of each coupled PCI device. This enables switch 201 to implement properly request/grant handshaking, store and forwarding, etc. Once the address map is built, switch 201 is ready for normal operation. Switch 201 can now implement multiple, simultaneous data transfers, as shown in steps 703–708 and steps 709–712 below.

In step 703, the switch of the present invention builds a prioritization table which indicates relative priority among various data transactions. For example, the prioritization table can be built such that the data transactions can be prioritized on a "data stream" basis (e.g., TCP socket, etc.), target device basis (shared bus), initiator device basis, or some combination of factors.

In step 704, switch 201 receives a write request from a first initiator for bus access. As described above, in a PCI based system, as with other shared busses, there is an arbitration for bus ownership at the beginning of each data transaction. When the request (e.g., REQ#) signal is received, switch 201 is notified of the pending transfer.

In step 705, switch 201 executes the REQ/GNT handshaking required to support PCI protocols. As described above, the REQ/GNT handshake process is spoofed.

In step 706, switch 201 receives data from the first initiator as it accepts the data write transaction. If switch 201 is implementing store and forward, it spoofs the target signals (e.g., TRDY#) and stores the write data in an output queue.

In step 707, the data transaction received from the first initiator is prioritized with respect to any other transactions received from other initiators. As described above, a priority selection criteria unit prioritizes among data transactions by selecting the appropriate output queue to be forwarded.

In step 708, switch 201 addresses the target of the data transaction and sends the data. The target device output port is addressed using the port determined during the snooping process. When the target device asserts TRDY#, the data transaction is forwarded from the corresponding output queue. This completes the data transaction.

Referring now to steps 709–712, as described above, switch 201 allows multiple simultaneous data transactions. Thus, in addition to receiving a write request from a first initiator in step 704, in this example, a write request from a second initiator is also received in step 709.

In step 710, switch 201 executes the request/grant handshaking, as in step 705.

In step 711, switch 201 addresses the target of the data transaction and requests the data.

In step 712, the target device is accessed and the data are sent from the target device to the initiator.

At the conclusion of steps 708 and 712, process 700 is depicted as proceeding back to steps 704 and 709. This illustrates the fact that process 700, after the building of an address map (e.g., step 702), functions continuously, receiving and facilitating data transactions of the various coupled initiator devices.

Thus, the present invention provides a method and system which enables greatly increased data transfer bandwidth between peripheral devices of a computer system. The present invention accommodates high bandwidth applications such as digital video, digital audio, 3D graphics, real-time compression and decompression, and the like. The present invention services the data transfer bandwidth requirements of the above applications while retaining compatibility with existing bus standards. In addition, the present invention provides greatly-increased data transfer bandwidth to peripheral devices designed to an existing bus standard in a completely transparent manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A shared bus emulating switch for implementing transparent direct communication between a plurality of shared bus devices, comprising:

a switch having a first port and a second port, said first port and said second port adapted to respectively couple to a first shared bus device and a second shared bus device;

a third port and a fourth port adapted to respectively couple to a third shared bus device and a fourth shared bus device;

said switch adapted to communicatively couple said first port and said second port to enable a transparent direct communication between said first shared bus device and said second shared bus device and communicatively couple said third port and said fourth port to enable a transparent direct communication between said third shared bus device and said fourth shared bus; and said communication between said third shared bus device and said fourth shared bus device simultaneous with respect to said communication between said first shared bus device and said second shared bus device, wherein said switch emulates a shared bus protocol.

2. The shared bus emulating switch of claim 1, wherein said shared bus protocol is a PCI bus protocol and said first shared bus device and said second shared bus device are PCI devices.

3. The shared bus emulating switch of claim 1, wherein said switch is adapted to spoof shared bus protocol signals such that communication with said switch is transparent with respect to said first shared bus device and said second shared bus device.

4. The shared bus emulating switch of claim 1, wherein said switch includes a plurality of input queues and a plurality of output queues which implement store and forward transfers between said first shared bus device and said second shared bus device.

5. The shared bus emulating switch of claim 1, wherein said switch includes a snooping logic unit adapted to snoop configuration accesses for said plurality of shared bus devices and build an address map for said first shared bus device and said second shared bus device therefrom.

6. The shared bus emulating switch of claim 1, wherein said first port and said second port are each adapted to respectively couple to said first shared bus device and said second shared bus device via a first dedicated bus and a second dedicated bus.

7. The shared bus emulating switch of claim 6, wherein said switch is adapted to implement handshake spoofing with said first shared bus device and said second shared bus device such that communication via said switch is transparent.

8. The shared bus emulating switch of claim 1, further comprising:

said switch having a third port adapted to couple to a shared bus, wherein said shared bus is coupled to a plurality of shared bus devices; and said switch including arbitration logic for arbitrating among said plurality of shared bus devices for ownership of said shared bus, wherein each of said plurality of shared bus devices communicate with said switch via said shared bus.

9. In a computer system having a shared bus adapted to couple to a plurality of shared bus devices, a data transfer system comprising:

a switch coupled to said shared bus, said switch having a first port and a second port, said first port and said second port adapted to respectively couple to a first shared bus device and a second shared bus device;

a third port and a fourth port adapted to respectively couple to a third shared bus device and a fourth shared bus device;

said switch adapted to communicatively couple said first port and said second port to enable a transparent direct communication between said first shared bus device and said second shared bus device and communicatively couple said third port and said fourth port to enable a transparent direct communication between said third shared bus device and said fourth shared bus; and said communication between said third shared bus device and said fourth shared bus device simultaneous with respect to said transparent direct communication between said first shared bus device and said second shared bus device, wherein said switch emulates a shared bus protocol.

10. The system of claim 9, wherein said shared bus protocol is a PCI bus protocol and said first shared bus device and said second shared bus device are PCI devices.

11. The system of claim 9, wherein said switch is adapted to spoof shared bus protocol signals such that communication with said switch is transparent with respect to said first shared bus device and said second shared bus device.

12. The system of claim 9, wherein said switch includes a plurality of input queues and a plurality of output queues which implement store and forward transfers between said first shared bus device and said second shared bus device.

13. The system of claim 9, wherein said switch includes a snooping logic unit adapted to snoop configuration accesses for said plurality of shared bus devices and build an address map for said first shared bus device and said second shared bus device therefrom.

14. The system of claim 9, wherein said first port and said second port are each adapted to respectively couple to said first shared bus device and said second shared bus device via a first dedicated bus and a second dedicated bus.

15. The system of claim 14, wherein said switch is adapted to implement handshake spoofing with said first shared bus device and said second shared bus device such that communication via said switch is transparent.

16. The system of claim 9, further comprising:

said switch having a fifth port adapted to coupled to an additional shared bus, wherein said additional shared bus is coupled to a plurality of shared bus devices; and said switch including arbitration logic for arbitrating among said plurality of shared bus devices for ownership of said shared bus, wherein each of said plurality of shared bus devices communicate with said switch via said shared bus.

* * * * *